United States Patent
Archer

(10) Patent No.: US 8,285,733 B2
(45) Date of Patent: Oct. 9, 2012

(54) SYSTEMS AND METHODS FOR CREATING A BROADCASTED MULTIMEDIA FILE

(75) Inventor: Donald Archer, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 377 days.

(21) Appl. No.: 11/643,889

(22) Filed: Dec. 22, 2006

(65) Prior Publication Data
US 2008/0152096 A1  Jun. 26, 2008

(51) Int. Cl.
*G06F 17/30* (2006.01)
(52) U.S. Cl. .......................... 707/758; 707/802
(58) Field of Classification Search .................. 707/758, 707/802
See application file for complete search history.

(56) References Cited

U.S. PATENT DOCUMENTS

| | | | |
|---|---|---|---|
| 6,895,084 B1 * | 5/2005 | Saylor et al. ............... | 379/88.22 |
| 7,426,687 B1 * | 9/2008 | Schultz et al. ............... | 715/208 |
| 2002/0044633 A1 * | 4/2002 | Nabha et al. ............... | 379/90.01 |
| 2003/0174816 A1 * | 9/2003 | Green et al. ............... | 379/88.17 |
| 2004/0076272 A1 * | 4/2004 | Zafar et al. ............... | 379/88.13 |
| 2007/0021145 A1 * | 1/2007 | Lam ............... | 455/556.1 |
| 2007/0094082 A1 * | 4/2007 | Yruski et al. ............... | 705/14 |
| 2007/0299874 A1 * | 12/2007 | Neumann et al. ............. | 707/104.1 |
| 2008/0005347 A1 * | 1/2008 | Ott ............... | 709/231 |
| 2008/0101762 A1 * | 5/2008 | Kellock et al. ................. | 386/52 |

* cited by examiner

*Primary Examiner* — Son T Hoang

(57) ABSTRACT

"Call casting" is the ability to create a broadcasted multimedia file from a telephonic device. A content originator selects an option to create a call cast from the telephonic device, and a processing unit receives a communication utilized in creating an episode file. The episode file is associated with a feed file, which is accessed by an audience. The feed file may be accessible from a user website. Additionally, the communication received by the processing unit may originate from the telephonic device or a voicemail server. The processing unit may comprise a voicemail server. The content originator may be provided with one or more options that affect the creation of the episode file or the association of the episode file to the feed file. These options may be provided over the telephonic device, or through use of an administrative website.

18 Claims, 12 Drawing Sheets

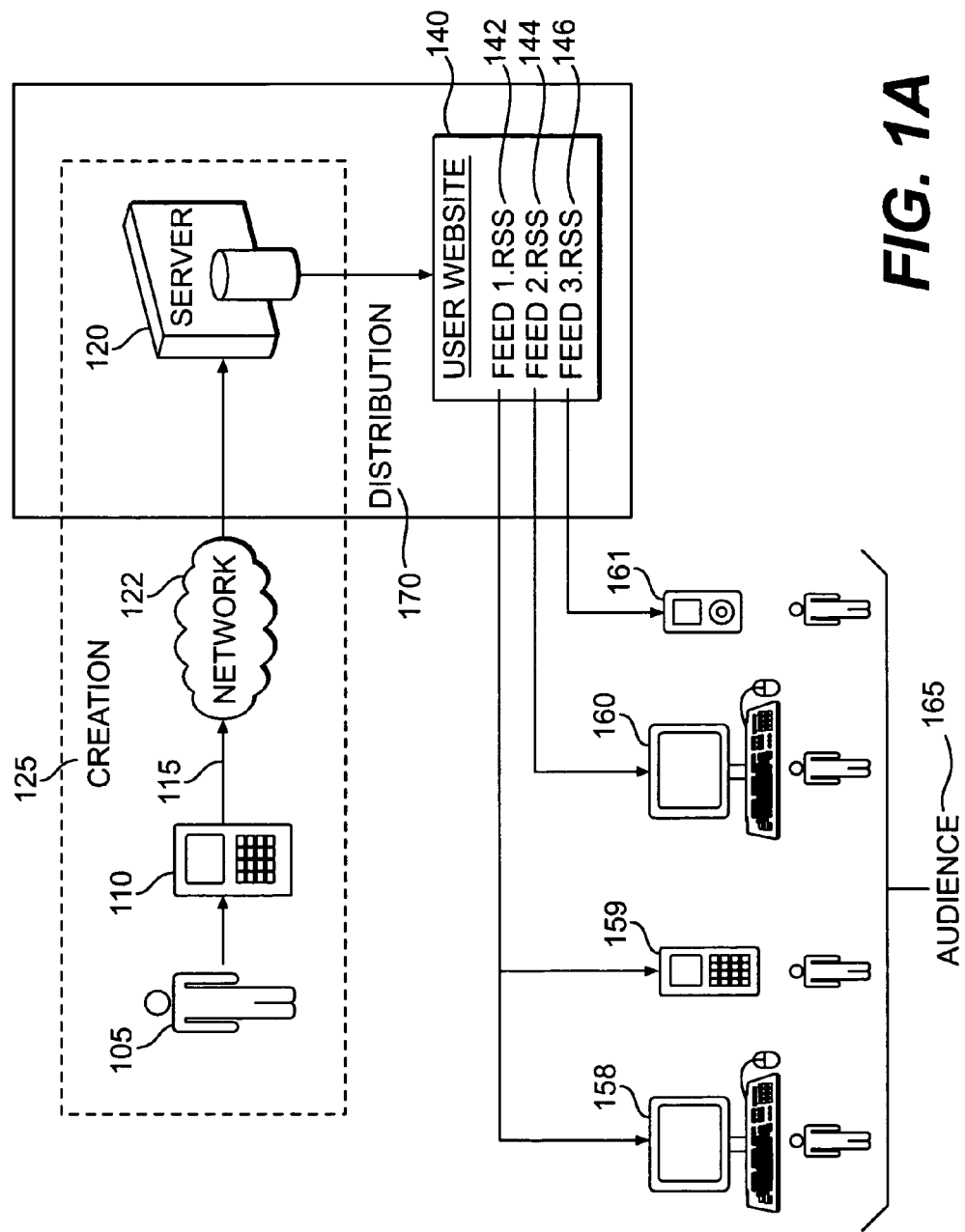

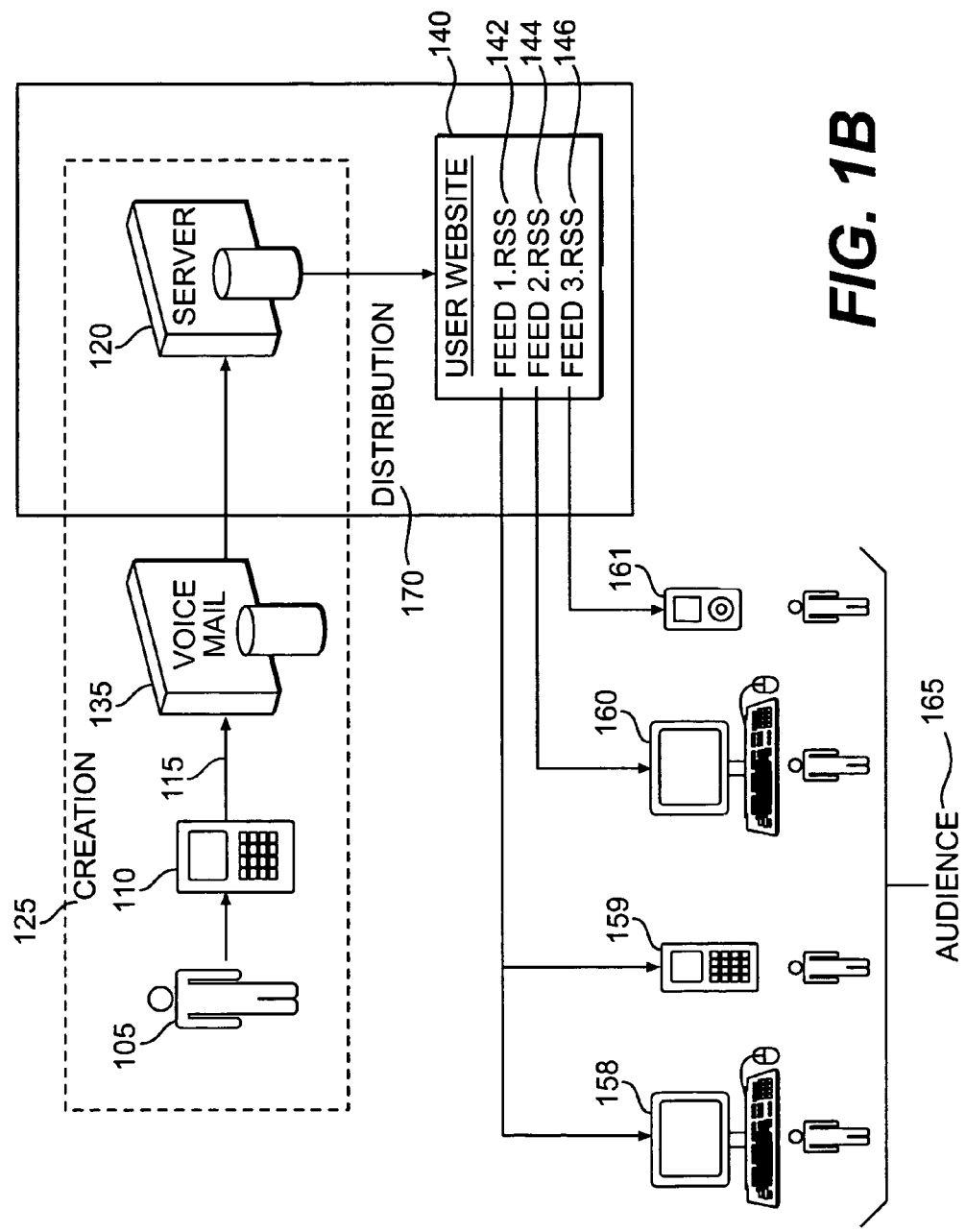

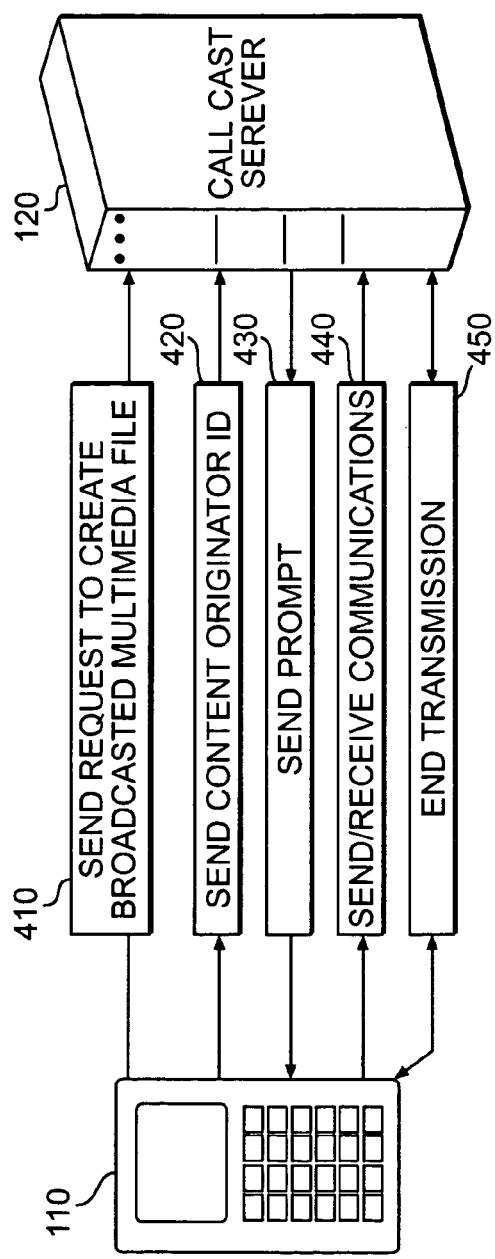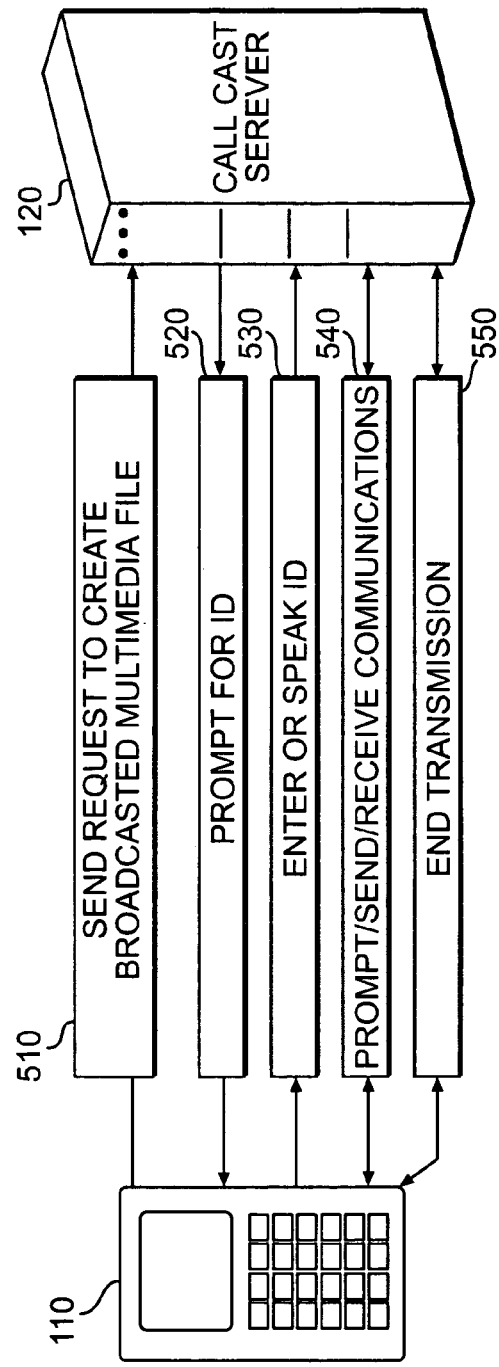

SYSTEMS AND METHODS FOR CREATING A BROADCASTED MULTIMEDIA FILE

BACKGROUND OF THE INVENTION

A podcast is one type of broadcasted multimedia file. A podcast usually comprises an episode file broadcasted over a network via a syndication feed. Once distributed, the episode is typically played back on a mobile device or personal computer. In this manner, podcasts have become a popular way to share an audio broadcast. Though done less frequently, podcasts are also useful for sharing visual files. Such broadcasted multimedia files can be thought of as a radio or television show delivered in a web log format. They may be created by one content originator, while others are a conglomeration of episodes provided by many content originators.

The hardware for creating a podcast usually involves at least one webserver for storing episode files that are uploaded by the content originator. The webserver does not have to be publicly available, and in some cases distributed mechanisms, such as BitTorrent, have been used instead of a webserver. The content originator creates a podcast by uploading the episode, typically in an audio or video format, to the webserver and providing a feed file that references the episode. A podcast audience accesses the podcast content over a network (for example the Internet) usually through use of conventional software that organizes and facilitates the streaming or downloading of the content. Typically, this software runs on a computer or a portable media player. The audience typically subscribes to the feed, and the associated one or more episodes are downloaded for consumption by the audience.

Common broadcasted multimedia file types used for episode files include MP3, WAV, etc. for audio, and GIF, BMP, TIFF, AVI, MOV, MPEG, etc. for visual files. After uploading an episode, the content originator then updates the feed, so that the feed references the episode. The feed usually comprises a list of episode locations and may include basic information describing the episodes. The feed may be located on the same, or different, webserver than the episodes. In either case, the feed usually has a fixed location.

Podcast audiences typically access the feed remotely by using what is commonly referred to as "podcatcher" software, which runs on a computer or portable media player. Most commonly, the podcatcher software manages which episodes will be downloaded for consumption by the audience member. This is done by managing a set of URIs (uniform resource identifiers) or URLs (uniform resource locators) for feeds chosen by the audience member. The podcatcher may monitor which episodes are new to the feed, and download those episodes in anticipation that the audience member will later enjoy (i.e., watch, listen, or otherwise consume) the episode. This also allows the audience member to archive and enjoy the episode at their leisure. Other software configurations might allow the audience member to stream the episodes, or first select which episodes are downloaded, in order to save bandwidth. As used herein, podcatcher software may be used for downloading other multimedia file types, and is not limited to downloading only podcast files.

While podcast audiences have grown dramatically, audience growth has significantly outpaced the increase in numbers of new content originators. Most content originators are companies with hired staff overseeing the creation and distribution of such broadcasted multimedia files. Individuals are often unwilling to invest the time and effort that creating a broadcasted multimedia file, such as a podcast, typically requires. The multiple steps involved in the process can be daunting, complex, and require equipment that many individuals lack. As a result, broadcast multimedia files, such as podcasts, have not achieved full potential as a form of self expression and remain difficult to create.

BRIEF DESCRIPTION OF THE DRAWINGS

The accompanying drawings, which are incorporated in and constitute a part of this specification, and together with the description, illustrate and serve to explain the principles of various exemplary embodiments.

FIGS. 1A-1D are overview diagrams of exemplary components used to create and access a broadcasted multimedia file in accordance with several exemplary embodiments.

FIG. 4 is an exemplary flow diagram of communications between a telephonic device and a call cast server in accordance with an exemplary embodiment when multiple content originators or profiles are associated with one telephonic device.

FIG. 5 is another exemplary flow diagram of communications between a telephonic device and a call cast server in accordance with an exemplary embodiment when multiple content originators or profiles are associated with one telephonic device.

DESCRIPTION OF THE EMBODIMENTS

Figure 1C:
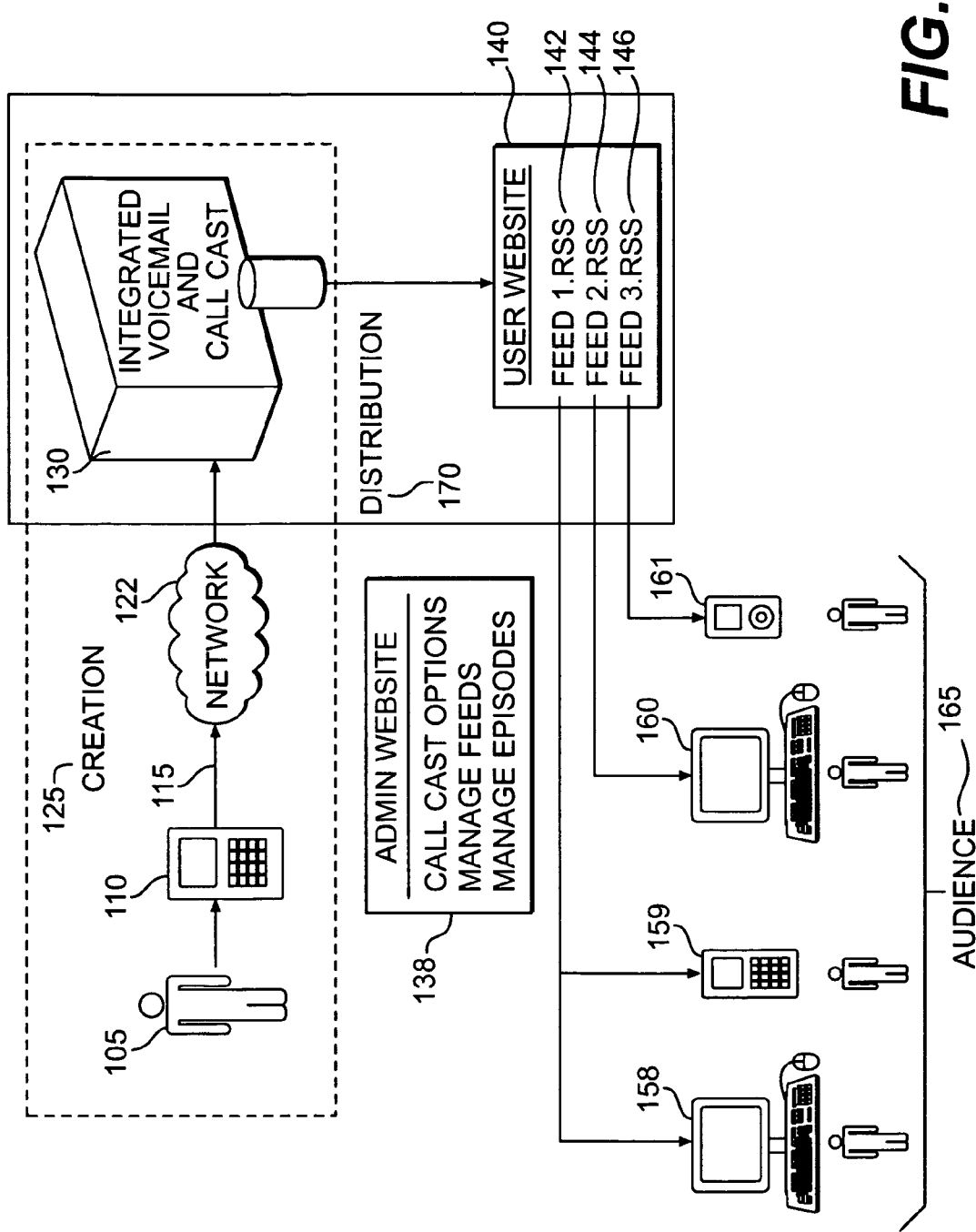

Reference will now be made in detail to exemplary embodiments, examples of which are illustrated in the accompanying drawings. Wherever possible, the same reference numbers will be used throughout the drawings to refer to the same or like parts.

It is to be understood that both the foregoing background description and the following detailed description are exemplary and explanatory only and are not restrictive of the invention as claimed.

An exemplary embodiment described below permits the content originator to use a telephone device to create a broadcasted multimedia file. Some telephonic devices, such as mobile phones, have become viable means for capturing media, including audio, pictures, and video. While some telephonic devices include mobile phone functionality, other telephonic devices connect to networks via landlines. Service subscription providers are constantly looking for new features to provide to their customers. These new features may add value that can influence which subscription service a person selects in the very competitive phone services industry, particularly with respect to wireless phones. In an exemplary embodiment, the ability to create a broadcasted multimedia file from a telephonic device, conveniently referred to herein as "call casting," may add dramatic value to a service subscription, and could facilitate an increase in the production of broadcasted multimedia files. Although a podcast is one example of broadcasted multimedia file, and principles of the exemplary embodiments are not limited to the podcast type of broadcasted multimedia file.

FIG. 1A is an overview diagram of exemplary components used to create and access a broadcasted multimedia file in accordance with an exemplary embodiment. Referring now to FIG. 1A, a creation portion 125 and distribution portion 170 of a system that creates broadcasted multimedia files is illustrated. As part of the creation portion 125, a content originator 105 uses a telephonic device 110 to create a broadcasted multimedia file by transmitting audio, video, pictures, and/or other communications 115 over a network 122, to a call cast server 120 through an interface (not shown), where the communications are processed. In the distribution portion 170, the processed communication is distributed to an audience 165. Although audio is the most commonly transmitted communication, exemplary embodiments may use other media types. The call cast server 120, a type of processing unit, is operative to process the received communication and create an episode file. The call cast server 120 then updates a feed file 142 by adding a link to the new episode. In one embodiment, the feed file 142 is eventually, if not immediately, made available on a user website 140. Exemplary embodiments may implement the user website 140 on server 120 or, alternatively, on a separate server (not shown). From there, an audience 165 can access the episode by using computers (e.g., 158, 160), phones 159 or other mobile audio player devices 161. Typically, software (commonly referred to as podcatcher software (not shown)) may be used on these audience devices to facilitate access to the feed 135.

In exemplary embodiments, the call cast server is more generally referred to as a processing unit. The processing unit is coupled to an interface, which may be part of the server or implemented as a separate physical device. In turn, the interface is coupled to the network. In operation, the interface receives a communication directed to the processing unit. The processing unit then receives the communication from the interface. The processing unit may comprise one or multiple computers or servers depending upon the implementation of the embodiment. In a more general sense, the processing unit may be considered as the processing circuitry within the one or more servers. As set forth in the figures herein, the processing unit may comprise the call cast server 120, the voice mail server 135, or an integration of both 130. These nonexclusive variations are generally shown in FIGS. 1A, 1B, and 1C.

The processing unit, such as server 120, creates an episode file out of the received communication, and stores the episode on a memory storage device. As shown in FIGS. 1A-C, server 120 is illustrated with a memory storage device. In general, a memory storage device is any medium capable of holding computer-readable data, and may be comprised of one or more devices for storing data. The one or more devices need not be located together or directly accessible via the same server. In an alternative embodiment, the episode is stored on a memory storage device associated with a separate server dedicated for the user website 140.

The audience 165 receives feed files, but may not be limited to users of telephonic devices. For example, as illustrated in FIGS. 1A-C, an audience member can use any device technically capable of accessing the feed 142, 144, 146 and capable of running the appropriate podcatcher type of facilitating software. Such devices include, but are not limited to, personal computers 158, servers, telephonic devices 159, PDAs, and MP3 players 161 with Internet access. Some devices, such as an MP3 player 161 or some PDAs, may alternatively access the episodes by communicating with some other device, such a personal computer 160, which downloads the episodes linked from the feed 142.

The accessibility of the feed file 142, which may be implemented as an RSS file, determines whether an audience 165 can enjoy the associated episodes. In one embodiment, the accessibility of the feed is set by the content originator 105. In other embodiments, the audience's 165 ability to access the feed may be determined by the content originator's 105 service subscription status or agreement, the audience member's service subscription status or agreement, or both. The service subscription may be a wireless service subscription, but also includes landline-based subscriptions.

In one embodiment, the user website 140 displays at least one feed file, and provides a URI (uniform resource identifier) or URL (uniform resource locator) for the feed file 142. Through accessing the user website 140, the audience 165 can enjoy the episodes linked from feed 142. In other embodiments, the audience 165 might not actually view the user website 140 in situations where their device 160 is running podcatcher software that knows where to find the feed file 142. For example, the audience member may visit the user website 140, input the feed 142 URL into the podcatcher software, and not view the user website 140 again. The podcatcher software may still download episode files that are added to the feed 142. In another embodiment, the feed file 142 is assigned a URI or URL without being posted to the user website 140.

In some embodiments, the user website 140 is implemented as being unique for each content originator 105. An audience 165 can view the user website 140 and have the impression that the website belongs to the content originator, even though, in some embodiments, the user website 140 is provided by the service provider that controls the call cast server 120 and the subscription associated with the telephonic device 110. In another embodiment, the user website contains contributions from multiple content originators 105. These content originators may have their own feeds or might share a feed that links to episodes created by various content originators. The exclusivity of the feed 142 may depend on an option selected by the content originator, the service subscription status or agreement, or both. Some service subscriptions may allow more than one content originator under the same subscription and/or provide different options for different content originators under the same subscription.

FIG. 1B is an example diagram of another exemplary embodiment where the broadcasted multimedia file is created via a voice mail system. In FIG. 1B, the content originator 105 uses a telephonic device 110 to create a broadcasted multimedia file by communicating with a voicemail system hosted on a voice mail server 135. Voice mail server 135, in turn, sends communications to a call cast server 120, where the communications are processed and distributed to an audience 165. In an alternative embodiment, the voicemail and call cast servers are integrated into a single server, such as server 130 shown in FIG. 1C. In that embodiment, the communication received by the call cast server from the voicemail server all take place within the integrated server 130. In either embodiment, the communication utilized in creating the broadcasted multimedia file may include control of a message and/or the message itself.

A message on the voicemail server 135 or integrated server 130, while usually audio, can include visual components in some embodiments. Additionally, the message may not necessarily contain an audio component.

Likewise, the communication from the voice mail server 135 may include audio, pictures, video, a combination thereof, or other multimedia. The call cast server may receive an additional communication from the telephonic device 110 when creating the broadcasted multimedia file. While the call cast server 120 typically receives a communication from the voicemail server 135, extra effects or additional audio may relay through the voice mail server 135 from the telephonic device 110 to the call cast server 120 in other embodiments. Alternatively, the voice mail server 135, may create effects in response to the communication 115 sent from the telephonic device 110, such as a key press. In yet another embodiment, the call cast server 120 receives a communication from both the voice mail server 135 and the telephonic device 115. In still another embodiment, all communication is sent from the telephonic device 110. In that embodiment, for example, the voice mail server may transmit an audio voice mail recording to the telephonic device, which then transmits the audio (plus any extra effects) to the call cast server 120.

The voicemail server 135 (or integrated server 130) may send a "create call cast" prompt to the content originator 105, along with the other options typically included in a voicemail system. The prompt may also be given with respect to each message. For example, along with the typical save, delete, and skip options associated with a message, the content originator 105 may be given the option to create a broadcasted multimedia file from the message. When this option is selected, at least a portion of the message is communicated to the call cast server 120 for use in creating a broadcasted multimedia file. In the integrated server 130, this communication occurs internally. With respect to FIGS. 1B and 1C, the distribution portion 170 of the system works as already described with reference to FIG. 1A.

The voicemail server 135 may comprise one or more computers or servers. As already stated, the voice mail server 135 and call cast server 120 may be integrated into a single server, such as server 130 in FIG. 1C. References to various named servers herein are not limiting. Unless explicitly stated otherwise, all referenced servers may operate as one single server, or a multitude of servers.

Referring now to FIG. 1C, a system similar to that shown in FIG. 1A is depicted with a server 130 that may host an administrative website 138 in accordance with an exemplary embodiment. The administrative website 138 may be used by a content originator 105 to set various call cast options and manage the broadcasted multimedia files, including those that appear on user website 140. The administrative website 138 may include more than one website and/or more than one webpage. The options selected through use of the administrative website 138 are used by server 130 for creating the episode file and managing associations between the created episode file and a new or existing feed 146. Additionally, the same episode can be associated to multiple feeds 142, 144, and 146. In one embodiment, the telephonic device may detect changes made on the administrative website 138 when creating broadcasted multimedia files. Additionally, the administrative website may allow the content originator to apply flexible and selective control over the broadcasted multimedia files. The options that may be available on the administrative website 138, or directly on the telephonic device, are explored in greater detail with reference to FIGS. 7 and 8, below.

While the administrative website 138 is depicted as being hosted on server 130 in FIG. 1C, a separate administrative server (not shown) may be used to host the administrative website 138 in another embodiment. As with other servers disclosed herein, the administrative server may comprise one or multiple computers or servers. The administrative server may be the same server as the call cast server 120, the voice mail server 135, or any other server capable of hosting a website. Similarly, although the user website 140 may be hosted by the call cast server 120, as illustrated, any other server may instead host the user website.

Figure 1D:
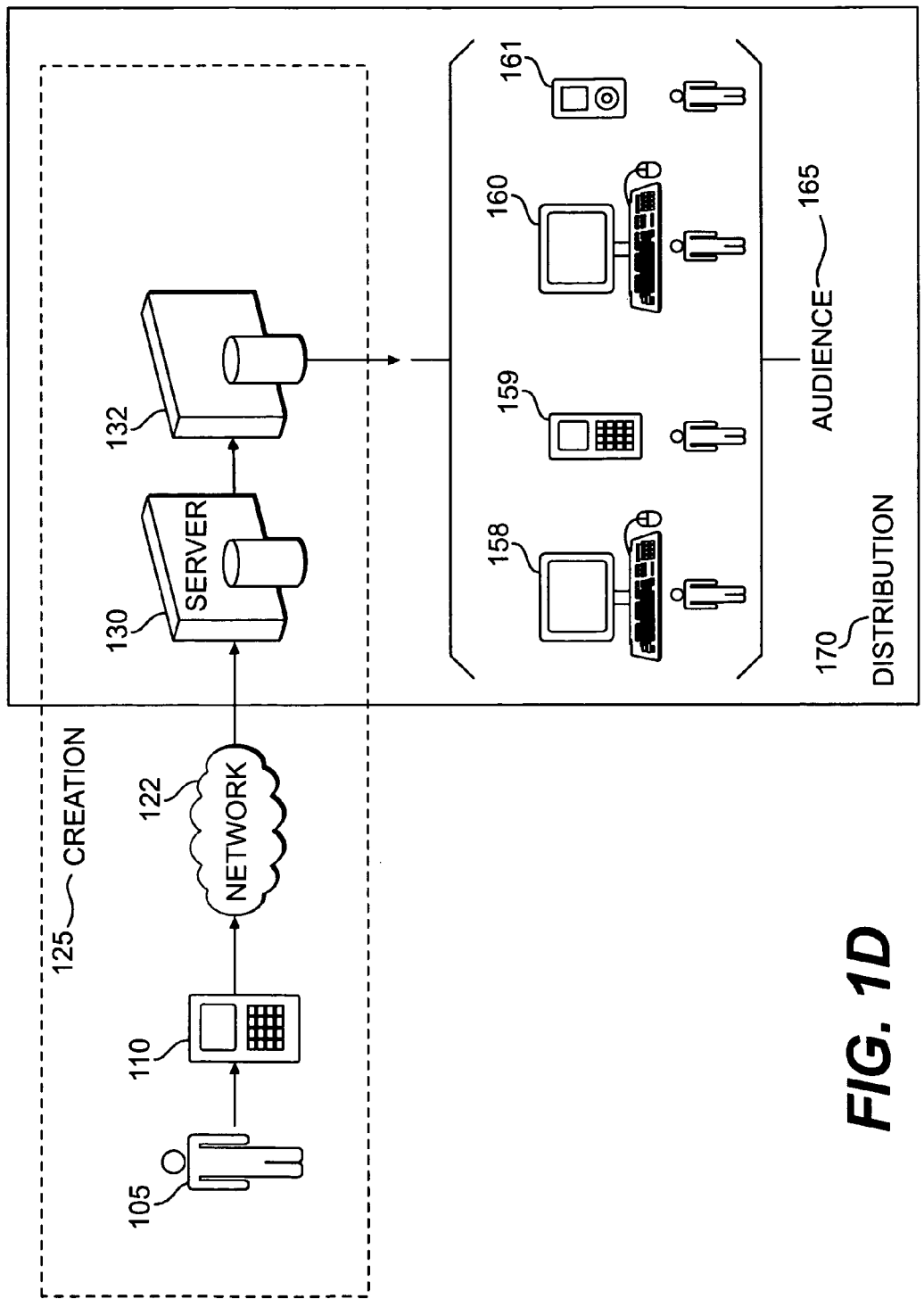

Referring now to FIG. 1D, a system is depicted with a server 130 that sends multimedia content to a content syndication service 132 in accordance with another exemplary embodiment. The server 130 receives information identifying a source of multimedia content. In this example, the source of multimedia content is telephonic device 110. The server receives the information over network 122, which, in some embodiments, may be a telephone network. Server 130 then verifies that the information identifying the source of multimedia content is valid. In response to this determination, the server 130 sends a request for multimedia content to the content originator 105. The content originator sends multimedia content to the server 120, which receives and stores the multimedia content.

However, in the embodiment in FIG. 1D, the integrated server 130 does not handle distributing the multimedia file. Instead, a separate content syndication service, running on server 132, receives the information associated with the multimedia content from server 130 and distributes the information to audience in response to a request. The content syndication service 132 may also handle some of the duties in creating the broadcasted multimedia file in some embodiments. It is important to note that the server arrangement for carrying out the embodiments discussed herein are not limited to those of FIGS. 1A-1D.

In some embodiments, audience members 165 anonymously contact the contact syndication service 132 over the internet to download one or more episodes. An anonymous request may not necessarily be unidentifiable. In many embodiments, an anonymous request simply does not require the audience to validate their identity through use of a special password before accessing the broadcasted multimedia file. Other means of identifying the audience member, such as IP address or other common means of identification, are still possible with respect to anonymous requests in many embodiments.

The content syndication server 132 may host a user website 140, as shown in FIGS. 1A-1C, or the broadcasted multimedia files may be accessible via some other method. For example, the content syndication server 132 may have a static IP address that is known by the podcatcher software of audience 165. Alternatively, the distribution service 132 may contact audience members 165 to notify them that a broadcasted multimedia file is available. In some embodiments, the audience members 165 may then anonymously contact the distribution server 132 at a known internet address to begin the downloading process.

Figure 2:
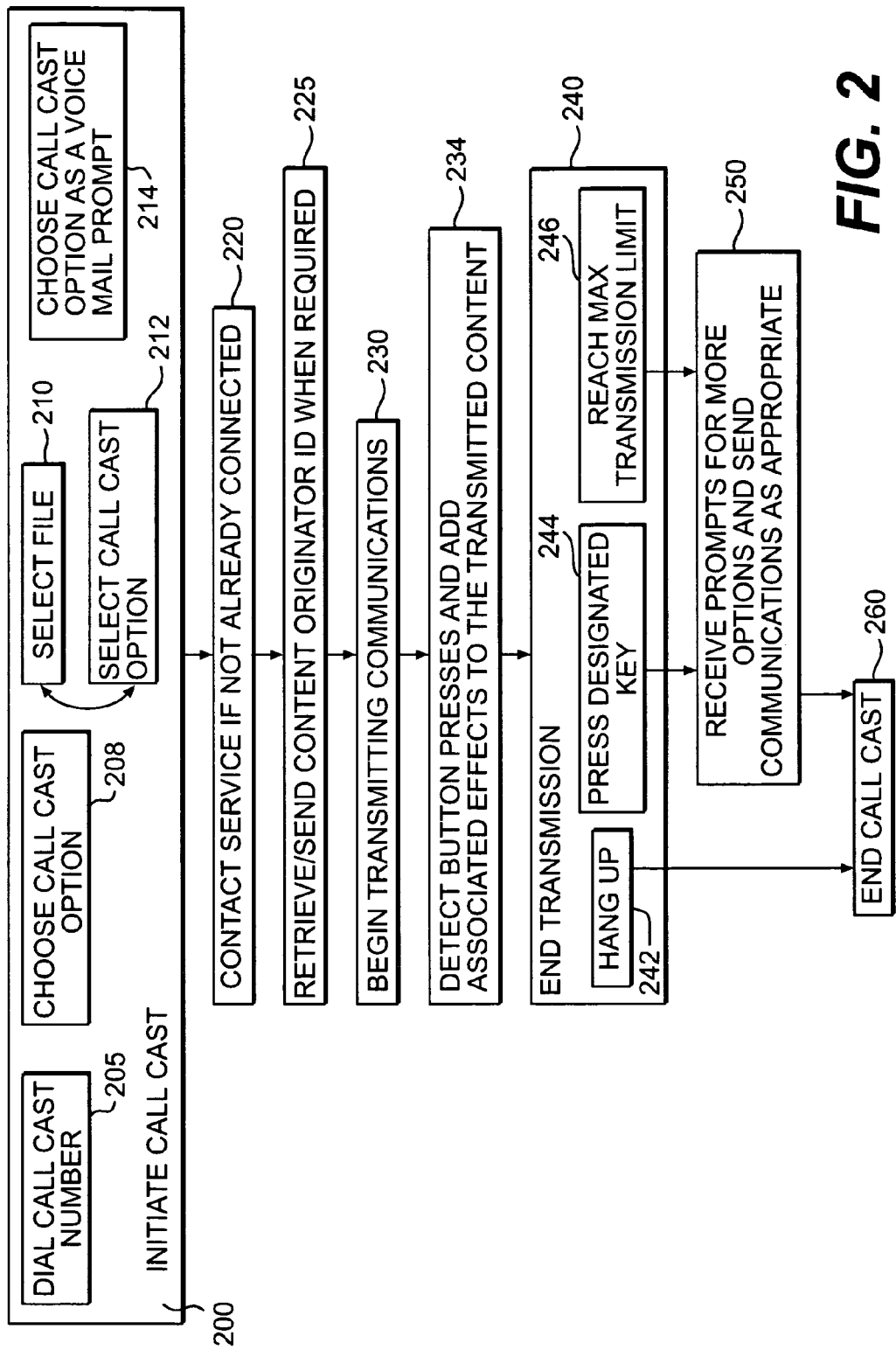
FIG. 2 is an exemplary flow chart of steps for creating a broadcasted multimedia file from a telephonic device in accordance with an exemplary embodiment.

FIG. 2 is an exemplary flow chart of steps taken by a telephonic device for creating a broadcasted multimedia file in some embodiments. Referring now to FIG. 2, the content originator 105 initiates creation of a broadcasted multimedia file from the telephonic device 110 in step 200. Dialing a call cast number 205 is one way the process may be initiated. More conveniently, a call cast option may be included on the telephonic device 110, and the content originator need only select the option 208 to begin the process. In one embodiment, the content originator may initiate creation of a broadcasted multimedia file after being prompted with the call cast option 214 in relation to a stored voice message. In yet another embodiment, the content originator may create a broadcasted multimedia file by selecting a stored file 210 (such as a stored message) to associate with call cast option 212. In different variations of this embodiment, the order of steps 210 and 212 may be reversed. In either case, the communication utilized in creating the episode file may include the file selected by the content originator.

After the call cast is initiated in step 200, the corresponding service (of the voice message server 135, the call cast server 120, or both 130) may be automatically contacted by the telephonic device 110 in step 220. In situations where the applicable server is already contacted, such as when the content originator is checking voicemail 214, step 220 may be bypassed.

At this point, the service may prompt the content originator for identification in step 225. A response to the prompt may require keying in a password or speaking into the telephonic device in some embodiments, while other embodiments do not require this step. In one embodiment, the telephonic device may have software for automatically sending identification of the content originator to the call cast server, without requiring input from a content originator. In another embodiment, identification may be handled by an identification unit, such as an exchange or switch, when validating the service subscription for the telephonic device. Alternatively, identifying the content originator may be handled by the voice mail server or the call cast server.

The system may allow each content originator to independently configure their call cast options. Additionally, the call cast server may automatically associate the created episode file with a feed file designated specifically for the identified content originator. Identifying the content originator could also allow a single content originator to store multiple profiles. This functionality is discussed more thoroughly with reference to FIGS. 9 and 10, below.

At step 230, the telephonic device begins transmitting one or more communications to the call cast server for use in creating the episode file. In some embodiments, the call cast server may prompt a content originator to begin transmitting a communication, much like a voice message system. However, the recorded communication is not limited to audio in all embodiments. Some embodiments may allow the telephonic device to upload a selected file. Other embodiments prompt the content originator with various call cast options before beginning step 230. Those options may be configurable by the content originator from the administrative website or from the telephonic device.

While the communication is transmitting, beginning in step 230, effects may be added in step 234. Some embodiments may allow a content originator to pre-assign effects to particular keys on the telephonic device. When the particular key is pressed, the associated effect may be applied to the outgoing communication. For example, a content originator may tell a joke and then press a key correlating to pre-recorded laughter. In that example, the call cast server would receive an audio communication including an audio representation of the joke with added laughter at the end. However, the assignable effects are not necessarily limited to audio effects. For example, a content originator may, while transmitting a video communication to the call cast server, press a key that causes the transmitted video to become black and white. Or, another key may function to superimpose a video clip on top of the video communication. For example, a content originator may press a key to superimpose a clip of curtains closing towards the end of a first video clip.

In another embodiment, pressing a key on the telephonic device in step 234 may trigger the processing unit handling the communication (e.g., the call cast server or the voice mail server) to apply the effect to the recorded communication. In some embodiments, those effects will be applied in sync with when the content originator presses the key during the transmitted communication.

When the content originator has finished transmitting the communication for use in creating the episode file, the transmission is ended in step 240. The transmission may end in a variety of ways, depending on the rules of the system. In one embodiment, a content originator may terminate communication from the telephonic device, usually by hanging up 242. Alternatively, the system may recognize pressing a particular key as signifying that the transmission is finished 244. Also, the transmission may terminate upon reaching a maximum transmission time or file-size limit 246.

In step 250, if the content originator is still connected to the call cast server, the call cast server may present options related to creating the broadcasted multimedia file. The telephonic device may, depending on the embodiment, visually or audibly relay those options to the content originator, and communicate any selections back to the call cast server.

The telephonic device's 110 call cast process ends in step 260 when the connection between the telephonic device and the call cast server is terminated by either the telephonic device or the call cast server.

Figure 3:
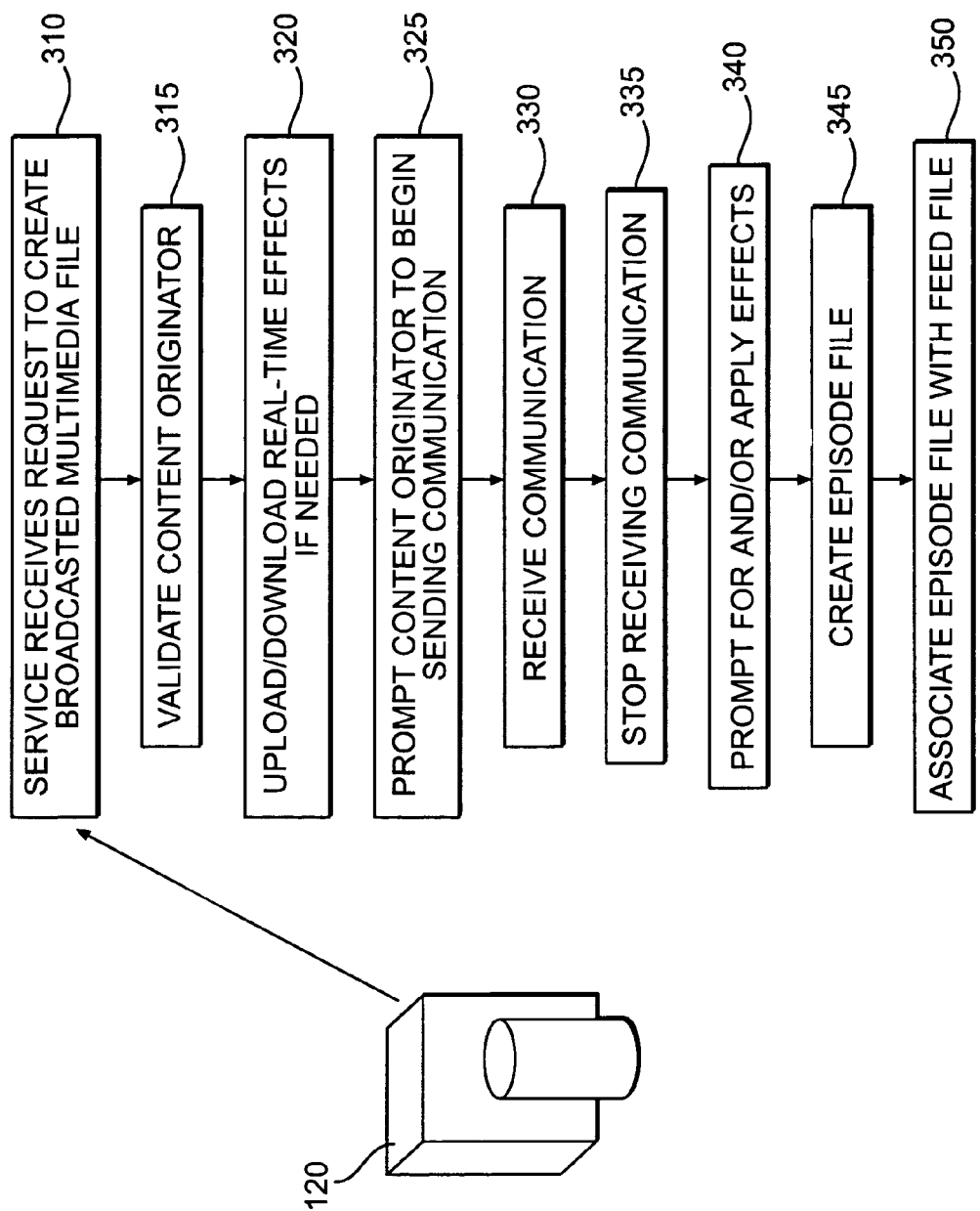
FIG. 3 is an exemplary flow chart showing steps followed by a call cast server when creating a broadcasted media file in accordance with an exemplary embodiment.

FIG. 3 is an exemplary flow chart of steps taken by the call cast server 120 when creating a broadcasted multimedia file in accordance with an exemplary embodiment. As with other call cast server functionality, the steps illustrated in FIG. 3 are equally applicable to embodiments where the call cast server 120 includes the voice mail server 135.

Referring now to step 310 in FIG. 3, a service running on the call cast server 120 detects that a content originator has selected an option to create a type of broadcasted multimedia file. This detection may occur in various ways, depending on the embodiment and/or settings defined by the content originator. In some embodiments, contacting the call cast server 120 signifies the desire to create a broadcasted multimedia file, and providing a connection to the telephonic device satisfies step 310. In other embodiments, the call cast server 120 may prompt a content originator to create a broadcasted multimedia file. When the content originator affirmatively responds by pressing a key or speaking into the telephonic device, the selection of the creation option is detected. A prompt-based system is particularly useful in embodiments where a voicemail server is involved, as in FIGS. 1B and 1C. However, such a system may still operate without requiring prompts to the content originator.

In one embodiment, the call cast server validates the identity of the content originator in step 315. If the content originator is already known, or if validation is not required, this step may be bypassed. The call cast server may receive automatic validation by the telephonic device. This is typically done by listening for validation upon (or before) allowing the telephonic device to connect. Automatic identification validation is discussed in more detail with reference to step 225 of FIG. 2, above.

In some embodiments, the call cast server may upload or download effects for adding to the received communication in step 320 before the transmission of the communications begins in step 330.

In step 325, the call cast server may prompt the content originator to begin transmitting the communication. The communication may be received in step 330 from the telephonic device and/or the voice mail server, depending on the system configuration. The call cast server will typically record the received communication into a temporary file, and apply effects to the file in step 340, after transmission ends. In some embodiments, effects are added in real time. In other embodiments, the call cast server does not add any effects to the communication received.

The call cast server stops receiving the one or more communications in step 335. For example, this may happen after it detects that the connection with the telephonic device is lost, after it detects an action from the content originator consistent with ending the transmission, or after the received communication reaches a specified maximum file size or length. The call cast server may only be capable of making one or two of these detections, depending on the embodiment. Additionally, the call cast server may immediately cease receiving communications upon making the detection, or there may be some delay.

Next, the call cast server may apply effects in step 340. In one embodiment, the effects may include file optimization options, such as compression. The effects can also include effects such as adding introduction and/or exit audio to the received communication and adding an announcement to the communication. The call cast server may prompt the content originator to select which effects to apply. Also, the prompts sent to the content originator may be customizable via the administrative website or directly from the telephonic device, depending on the embodiment. Some or all of these effects may be applied without prompting.

After step 340, the episode file is created and stored in step 345. This step may, in some embodiments, occur simultaneously with step 350, wherein the episode file is associated with a feed file. The episode file is stored in a memory storage device, which may include one Or more storage drives, servers, and/or relational databases.

Creation of the episode file may include giving a name or title to the episode, formatting the episode as a particular file type, and other similar tasks. The episode file may also contain data attributing the file to a particular content originator, marking the file for delete after a certain time period, or other administrative features. Additionally, the episode file may be inventoried or tracked in one or more relational databases (not shown).

In step 350, the episode file is associated with a feed file. In one embodiment, the call cast server may verify that a default feed file exists, and associate the created episode file with the feed file. As already stated, this verification may instead occur before or during the creation of the episode file. In some embodiments, if no default feed file exists, a new feed file is created and associated to the episode file. In other embodiments, the episode file may be created and stored for later association with a feed file. The default feed file may be specified as part of the service subscription, or it may be an option selectable by a content originator. One type of feed file may only reference episode files created by one content originator, while another type may reference an episode file created by any content originator under the same service subscription. Still another type of feed file may be associated with episode files from various content originators, regardless of service subscription.

In some embodiments, the content originator may control which one or more feed files the call cast server associates with the new episode file. This may be done via an administrative website 138 or, in some embodiments, on the telephonic device 110. The options are more fully explored with respect to FIG. 8, below.

As previously mentioned, the association between the episode file and feed file is typically achieved by storing a URI or URL in the feed file that points to the episode file. The feed file can therefore be thought of as a list of addresses in most embodiments. However, the feed file may also contain other information, such as episode descriptors. The RSS file type is a common feed file type, but other feed file types are possible.

FIGS. 4 and 5 are exemplary flow diagrams depicting directed communications between a telephonic device and a call cast server in an embodiment including multiple content originators or profiles associated with the same telephonic device 110. For example, when two content originators 110 sharing a telephonic device and service subscription would like to create their own broadcasted multimedia file, the call cast server 120 may need to distinguish between the content originators in order to pair a created episode file with the correct one or more feeds.

The exemplary methodology of FIGS. 4 and 5 may also be followed where only one content originator uses a particular telephonic device 110. Aside from extra security, the one content originator may create several profiles with different settings. Supplying identification may be an easy way to select which profile the content originator will use, and a convenient way of specifying which settings the call cast server should employ. However, the identification of the content originator may alternatively occur later in the broadcasted-multimedia-file creation process.

Referring now to the example shown in FIG. 4, the telephonic device 110 may send a request to create a broadcasted multimedia file to the call cast server 120 in step 410. In this example configuration, the telephonic device automatically sends the current content originator identification to the call cast server 120 in step 420. The content originator identification may be stored on the telephonic device, or specified by the content originator when choosing to create a broadcasted multimedia file, depending on the embodiment. From there, sending the prompt 430, receiving the communication 440, and ending the transmission 450 may operate as already described with reference to FIGS. 2 and 3, above.

Conversely, the telephonic device 110 in FIG. 5 does not automatically send the content originator identification. Instead, in step 520, the call cast server 120 prompts the telephonic device to enter a password or some other form of identification. The call cast server 120 may recognize a typed and/or vocal response in step 530 as the identity of the content originator. As previously mentioned, the call cast server may then use the administrative settings associated with the identified content originator. Thus, the content originator may customize the prompts received and the communication settings involved in step 540.

Figure 6:
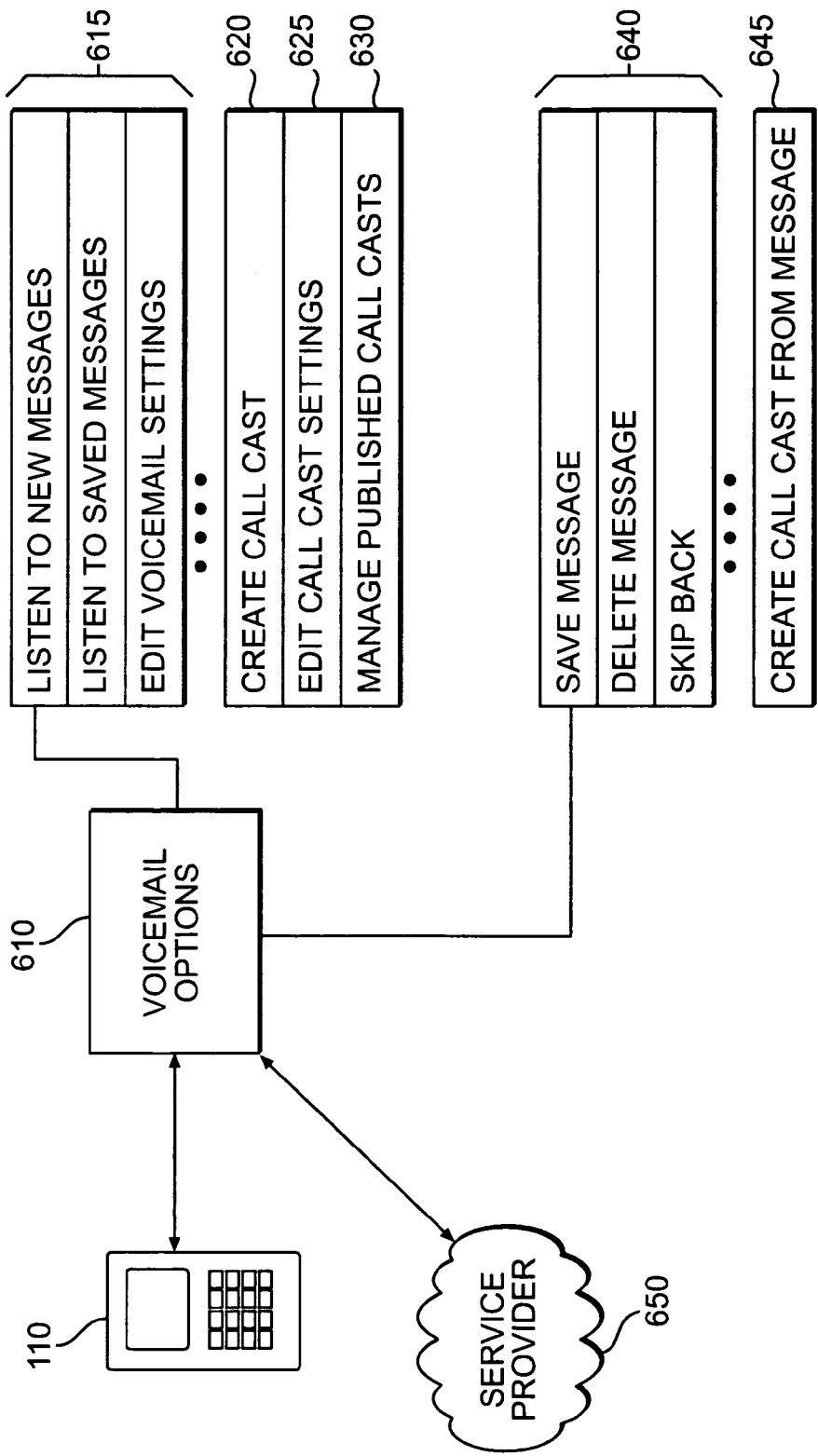
FIG. 6 is an exemplary diagram illustrating call cast options that are provided as voice mail options in accordance with an exemplary embodiment.

FIG. 6 illustrates one example embodiment wherein the content originator accesses the call cast options as part of a voicemail package hosted on a voicemail server. The voicemail options 610 may be provided from the voicemail server (such as server 135) as an audio prompt, or may appear visually on the telephonic device 110. Typically, the content originator contacts the voice mail server by selecting a voicemail option on the telephonic device 110. Alternatively, the content originator may enter a phone number specified by the service provider (typically his or her own number) to access the voicemail account. The voicemail account is provided by the service provider 650, to which the telephonic device 110 is subscribed.

Along with the typical voicemail options 615, the voicemail server provides call cast options, such as options 620, 625, and 630, as main options to the voicemail system in one exemplary embodiment. For example, selecting "create call cast" 620 starts the process to make a type of broadcasted multimedia file. In another example, selecting "edit call cast settings" 625 may retrieve a submenu for the content originator where the submenu contains call cast options similar to those of example FIG. 8, discussed below. "Manage published call casts" 630 similarly may retrieve a submenu or a graphical representation for managing previously created broadcasted multimedia files, such as the one shown in FIG. 7. Again, depending on the embodiment, these menus and submenus may be graphical or audibly portrayed to the content originator.

In some embodiments, the conventional options associated with a particular voice message 640 may include an option to create a type of broadcasted multimedia file 645 from a voice message. In this example, selecting the creation option results in the associated voice message being used as a basis for creating an episode file. This operation generally applies to the embodiments depicted in FIGS. 1B and 1C, but is not limited to those embodiments. If the call cast server is integrated 130 with the voicemail server, as in FIG. 1C, the communication received from the telephonic device may comprise selecting the use of the voice message in creating the episode file. So, in that embodiment, although the telephonic communication is utilized in creating the episode file, it is the voice message that serves as a basis for the episode file content. In some of these embodiments, the telephonic communication may also include a key press indicative of an effect to be added to the voicemail communication, or the actual effects may be simultaneously sent from the telephonic device.

Figure 7:
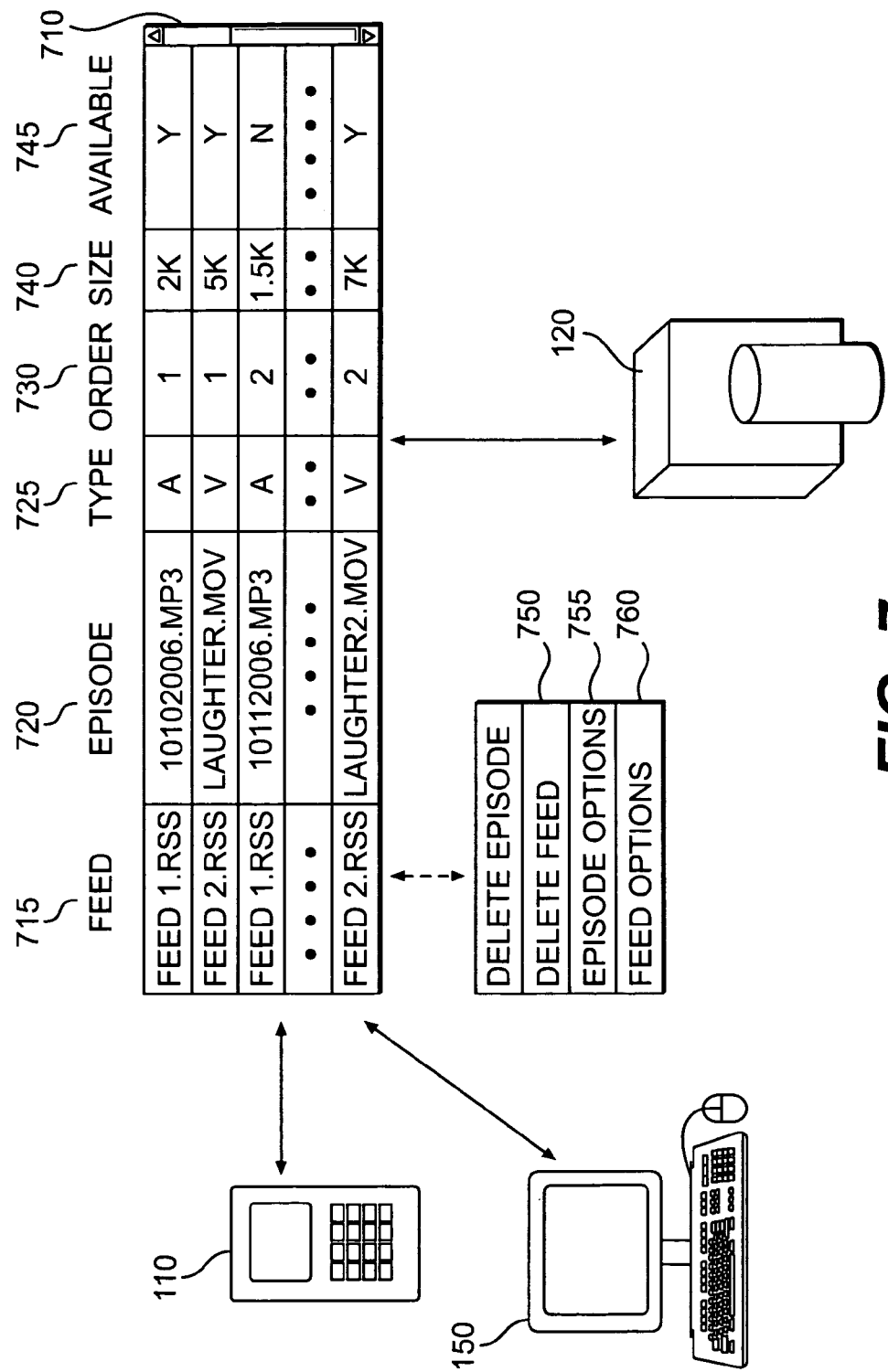
FIG. 7 is a diagram illustrating example call cast management options available in accordance with an exemplary embodiment.

FIG. 7 is a diagram illustrating an example call cast management screen 710. The screen may be part of the administrative website, which is typically hosted on the administrative server, but may be hosted by any other server. For example, FIGS. 1C and 7 depict the call cast management screen as originating from the call cast server. In some embodiments, a similar screen may be accessible on the telephonic device 110.

The administrative website 138 may comprise multiple webpages or websites. Similarly, the call cast management screen, as referred to herein, can comprise multiple screens. The administrative website may be accessible by a content originator on a personal computer 150 or on a web-enabled telephonic device 110. Typically, the content originator is identified before access is granted to the administrative website.

One purpose of the call cast management screen is to allow the content originator to manage existing relationships between one or more episodes and one or more feeds that are under the content originator's control. Referring now to FIG. 7 and as an example of the options that may be available, the content originator may assign an episode 720 to feed 715, prioritize the order 730 of episodes 720 within a feed 715, rename an episode, delete an episode, delete a feed, and set the access rights to an episode and/or feed, among other possible options. The menu may be presented in numerous ways, and may include a dropdown menu 750, or group together episode options 775 and feed options 760.

In addition, the call cast management screen may allow the content originator to modify which feeds are available 745 on the user website. As previously discussed for some embodiments, the user website may display feeds for the audience.

Figure 8:
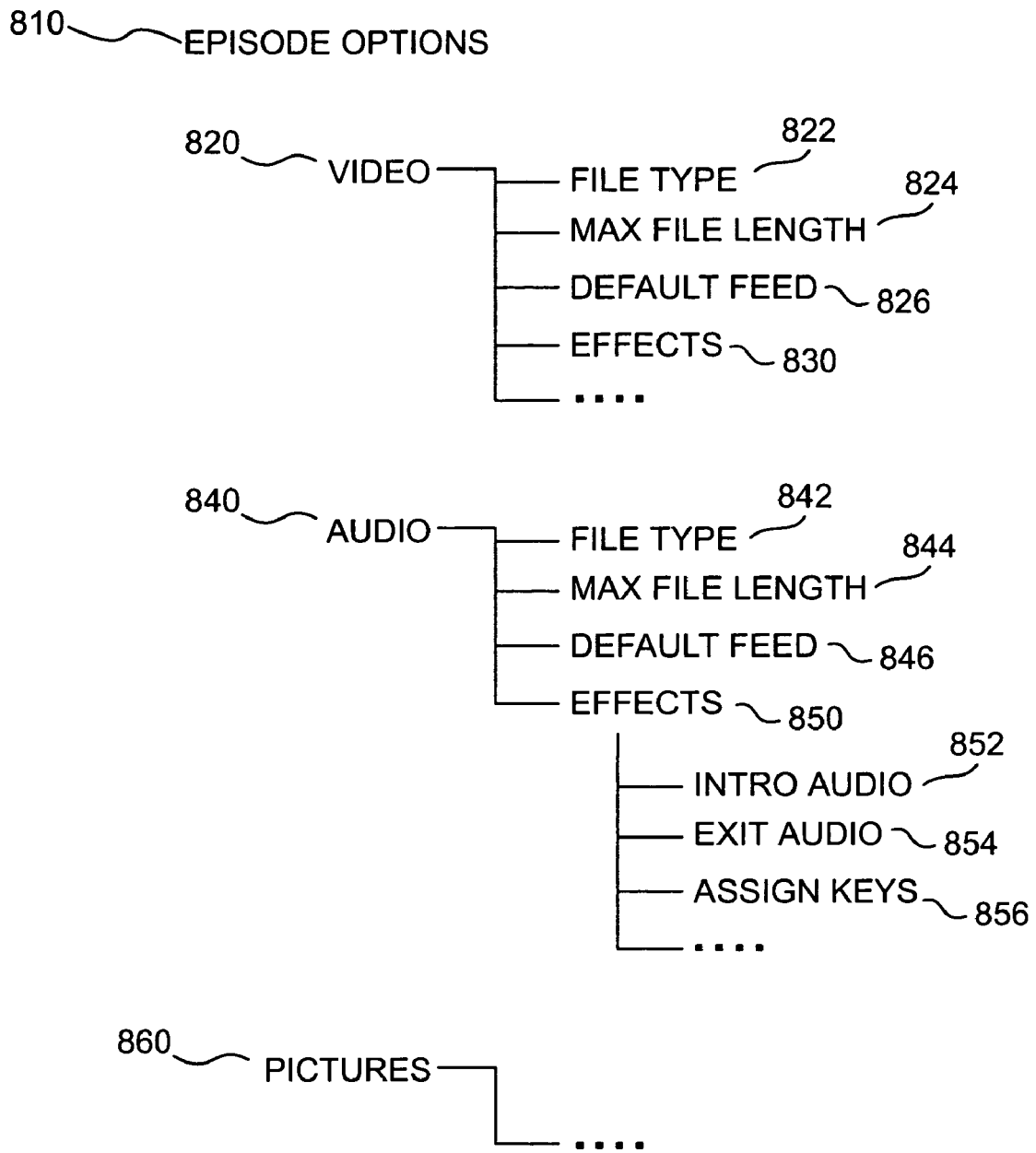
FIG. 8 is a diagram illustrating example call cast options available in accordance with an exemplary embodiment.

FIG. 8 shows an example option tree available on the administrative website or the telephonic device. In the example, the content originator can select the default feed 822 or 842 to which newly created episodes should be associated. Also, the "assign keys" option allows a content originator to assign an effect to keys on the telephonic device. As already explained, the content originator can add effects to the transmitted communication by pressing the keys during, or after, the transmission. The options may be organized by media type, for example, as shown in FIG. 8, wherein video 820, audio 840, and picture 860 options are grouped together.

Figure 9:
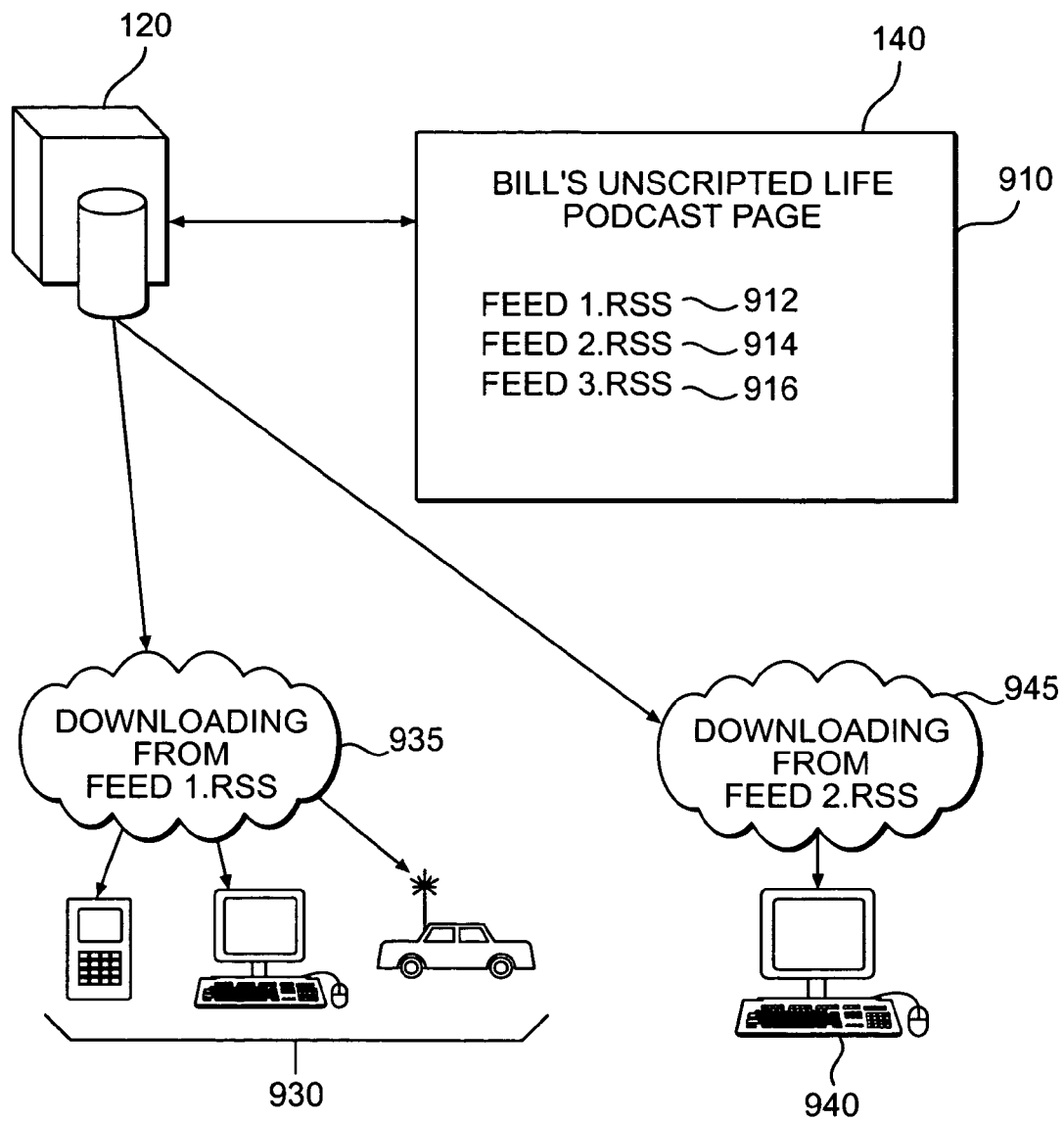
FIG. 9 is a diagram illustrating an example user website that has multiple feed files associated with one content originator in accordance with an exemplary embodiment.

FIG. 9 is a diagram illustrating an example user website 140 that has multiple feed files associated with one content originator in accordance with an exemplary embodiment. In the example of FIG. 9, the content originator, Bill, has three feed files, Feed1 912, Feed2 914, and Feed3 available on user website 140. The example shows the website as hosted by the call cast server 120, but any server will suffice. When the audience 930 or 940 goes to the URL for the user website 140, the website appears as if it is Bill's personal podcasting page. The audience 930 subscribes to Feed1 912, while audience 940 subscribes to Feed2 914. Feed1 912 may reference different episodes than Feed2. The podcatcher software in each device of audience 930 downloads the files associated with Feed1 912, while the podcatcher software in each device of audience 945 downloads the episodes associated with Feed2 914.

Figure 10:
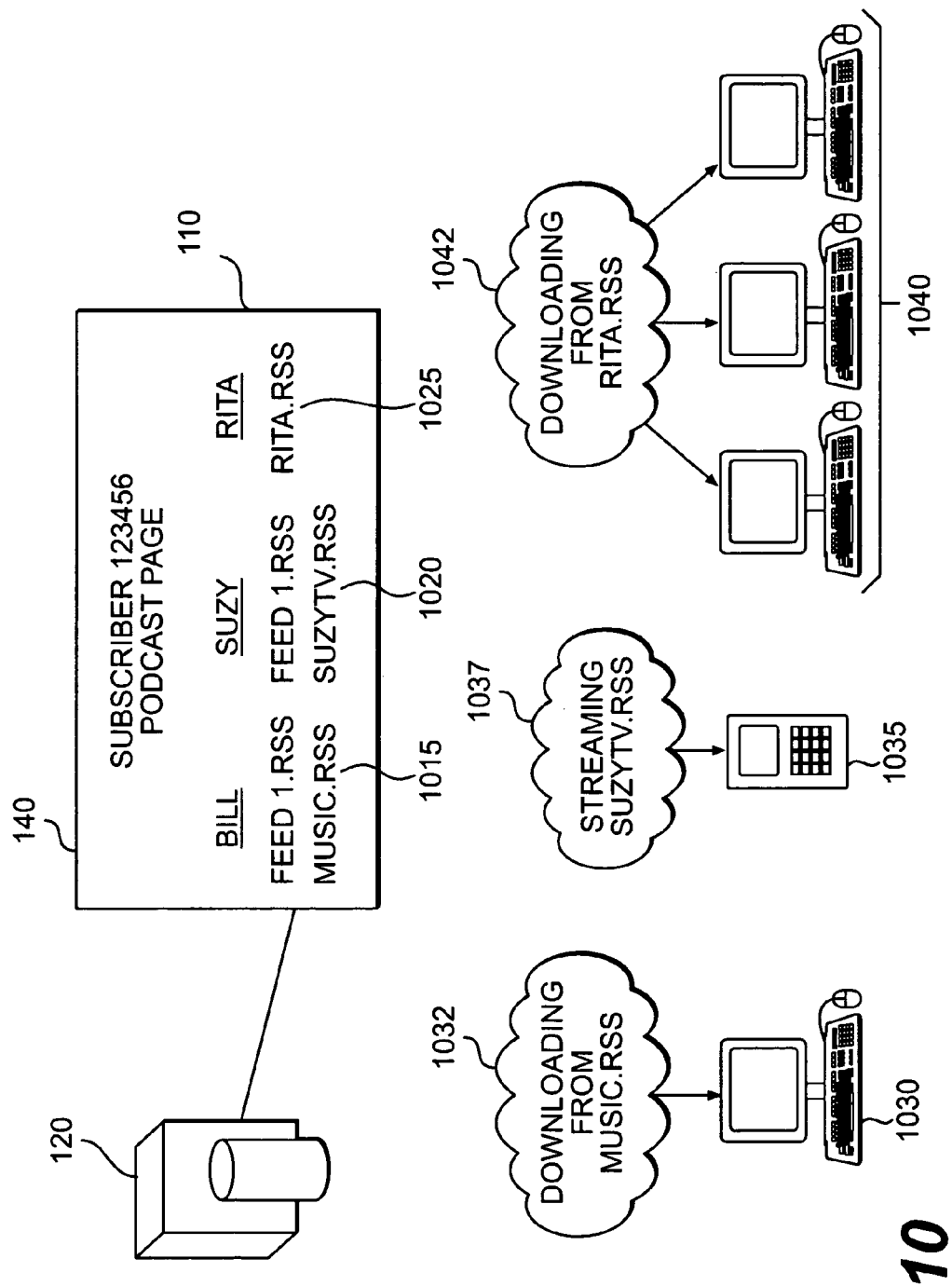
FIG. 10 is a diagram illustrating an example user website that has multiple feed files associated with multiple content originators in accordance with an exemplary embodiment.

FIG. 10, on the other hand, is a diagram illustrating an example user website 140 that has multiple feed files associated with multiple content originators in accordance with an exemplary embodiment. This time, user website 140 displays feeds associated with Bill and Suzy. The feed Rita.rss 1025, belongs to both Bill and Suzy, and contains episodes involving their baby daughter, Rita. Because Rita.rss 1025 is a shared feed, the options available may be different than those relating to an exclusively owned feed 1015.

In this example, Bill and Suzy are both associated with the same telephonic device by the service provider. Therefore, Bill verifies his identification when creating or modifying a broadcasted multimedia file, and the call cast server allows him to modify those files associated with his content originator identification. In this case, that includes Feed1 and Music 1015, and, to a limited extent, Rita 1025.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Other exemplary embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An computer-implemented system for creating a broadcasted multimedia file, the system comprising:
   a hardware interface coupled to a network, wherein the interface receives a communication from a telephonic device over the network;
   a voicemail server comprising a computer processor coupled to the interface,
      wherein the voicemail server stores voice messages recorded when an intended recipient of a phone call does not answer the call,
      wherein the voicemail server presents options to a user of the telephonic device that are selected by pressing keys on the telephonic device, including options related to retrieval and management of a voice message for which the user is the intended recipient and creation and management of an episode file, the options affecting functionalities of the computer processor after selections by the user, including options for handling the voice message, including:

options to save, delete, and skip the voice message; and an option to create the episode file from the voice message left in response to the user not answering the phone call;

wherein the processing unit utilizes the voice message stored by the voicemail server to create the episode file, and associates the episode file with a feed file, the feed file being selected for association with the episode file by the user from amongst a plurality of feed files, wherein the voicemail server:

recognizes a first keystroke from the telephonic device and creates the episode file based on the first keystroke on the telephonic device, and in response to the recognized first keystroke, receives the communication over the telephonic network to initiate the creation of the broadcasted multimedia file, wherein the communication includes audio provided by the user into the telephonic device, recognizes a second keystroke causing an audio effect to be applied in synchronization with the second keystroke being recognized during receipt of the communication from the telephonic device to modify the communication, associates the modified communication with the feed file; and a memory storage device coupled to the computer processor and operative to store the episode file and the feed file, the feed file being stored in a location accessible by an audience that includes at least one person other than the user.

2. The system of claim 1, further comprising a user website, wherein the audience can access the feed file from the user website.

3. The system of claim 2, further comprising an administrative server connected to the network, the administrative server being operable to affect operations of the user website based on selections by the user.

4. The system of claim 2, further comprising an administrative website connected to the network, the administrative website being accessible by the user, wherein the administrative website includes an option that alters content on the user website that is available to the audience.

5. The system of claim 1, further comprising an administrative server connected to the network, wherein the administrative server hosts an administrative website operative to receive a selection from the telephonic device and store the selection at a location accessible by the processing unit; and wherein the processing unit is operative to utilize the selection when creating the episode file.

6. The system of claim 1, further comprising an administrative website connected to the network, the administrative website being accessible by the user, wherein the administrative website includes an option that alters the creation of the episode file by the processing unit.

7. The system of claim 1, further comprising an administrative website connected to the network, the administrative website including an option to manage an association between the episode file and the feed file.

8. The system of claim 1, wherein the processing unit is further operative to request identification from the user; and wherein the processing unit is further operative to associate the feed file to the episode file based on criteria comprising the identification of the user.

9. The system of claim 1, further comprising an administrative website in communication with the voicemail server, the administrative website including an option to manage which options related to episode file creation and management are presented to the user through the telephonic device by the voicemail server.

10. A non-transitory computer readable storage medium containing software, the software being executable by a processor in a telephonic device, the software comprising instructions, which when executed, perform a method of creating a broadcasted multimedia file, comprising:

receiving a creation option from a voicemail server for creating the broad casted multimedia file using the telephonic device, the creation option being selectable by a content originator using the telephonic device, the voicemail server also facilitating recordings when an intended recipient of a phone call does not answer the phone call, wherein the voicemail server provides options to the content originator for handling a voice message left in response to the content originator not answering the phone call including:

options to save, delete, and skip the voice message; and an option to create an episode file from the voice message left in response to the content originator not answering the phone call, the episode file being associated with a feed file;

detecting selection of the option to create the episode file, wherein selection occurs by a first keystroke on the telephonic device by the content originator;

in response to the detected selection of the option to create the episode file, sending a communication over a telephonic network to the voicemail server to initiate the creation of the broad casted multimedia file, wherein the communication includes audio provided by the content originator into the telephonic device;

detecting a second keystroke on the telephonic device from the content originator that indicates an audio effect to apply to the communication at the voicemail server, wherein the audio effect is applied by the voicemail server in synchronization with the second keystroke being detected during receipt of the communication from the content originator to modify the communication; and associating the modified communication with the feed file, wherein the feed file is accessible by an audience that includes at least one person other than the content originator.

11. The non-transitory computer readable storage medium of claim 10, wherein selecting the creation option causes the telephonic device to notify the voicemail server to send the communication to another server for utilization in the creation of the broadcasted multimedia file.

12. The non-transitory computer readable storage medium of claim 10, wherein the software further includes instructions for causing the telephonic device to allow the content originator to select a file stored on the telephonic device as a source of the communication sent from the telephonic device.

13. The non-transitory computer readable storage medium of claim 10, wherein the software further includes instructions for:

providing an option for identifying the content originator; and sending an identity of the content originator over the telephonic network.

14. The non-transitory computer readable storage medium of claim 10, wherein the software further includes instructions for causing the telephonic device to provide a plurality of selectable options that affect creation of the broadcasted multimedia file, the plurality of selectable options including the creation option.

15. A computer-implemented method for creating a broadcasted multimedia file, the method having steps comprising:

provaging, via a voicemail server, options to a content originator related to a voice message recorded in response to the content originator missing a phone call, the options including:

options to save, delete, and skip the voice message; and an option to create a first episode from the voice message left in response to the content originator not answering the phone call, the first episode file being associated with a feed file that is accessible by an audience that includes at least one person other than the content originator;

receiving, via the voicemail server, a request to create the broadcasted multimedia file, the request being from the content originator using a telephonic device, the request comprising a first keystroke being made by the content originator on the telephonic device, wherein the voicemail server also facilitates recordings when an intended recipient of a phone call does not answer the call;

receiving, at via the voicemail server, a communication from the telephonic device for use in creating the broadcasted multimedia file;

detecting, via the voicemail server, a second keystroke on the telephonic device by the content originator that indicates an audio effect for the voicemail server to apply to the communication received from the telephonic device, wherein the audio effect is applied to the communication by the voicemail server in synchronization with the second keystroke being detected during receipt of the communication from the content originator;

creating, via the voicemail server, a second episode file that utilizes the received communication and the audio effect;

associating the second episode file with the feed file; and storing associations of the first and second episode files with the feed file association in a tangible memory device, wherein the feed file is accessible by the audience as the broadcasted multimedia file.

16. The computer-implemented method of claim 15, further comprising providing an administrative website that includes an option that adds an effect to the received communication, wherein the option is selectable by the content originator and the effect is different than the audio effect.

17. A computer-implemented method for creating a broadcasted file, comprising:

providing, via a voicemail server coupled a telephone network, options to a user related to a voice message recorded in response to the user missing a phone call, the options including:

options to save, delete, and skip the voice message; and an option, via a first keystroke on a telephonic device over the telephone network, to create an episode file from the voice message left in response to the user not answering the phone call, the episode file being associated with a feed file that is accessible by an audience that includes at least one person other than the user;

receiving, at the voicemail server, information identifying a source of multimedia content, wherein the multimedia content is separate from the voice message;

determining, via the voicemail server, that the information identifying the source of the multimedia content is valid;

sending, via the voicemail server, a request for multimedia content in response to the determining;

receiving, via the voicemail server, the multimedia content from the telephonic device over the telephone network;

detecting, at the voicemail server, a second keystroke on the telephonic device;

modifying, via the voicemail server, the multimedia content by adding an audio effect to the multimedia content in response to the detected second keystroke on the telephonic device, wherein the audio effect is applied to the multimedia content at a location in synchronization with the second keystroke being detected during receipt of the multimedia content;

associating, via the voicemail server, the modified multimedia content with the feed file;

storing, in a tangible memory of the voice mail server, the feed file;

receiving, via the voicemail server, an anonymous network request for the feed file; and providing, via the voicemail server, the feed file in response to the anonymous request.

18. The computer-implemented method of claim 17, further comprising sending information associated with the feed file to a content syndication service.

* * * * *